(12) United States Patent
Fujiwaka

(10) Patent No.: US 12,131,423 B2
(45) Date of Patent: Oct. 29, 2024

(54) ANALYSIS APPARATUS, COMMUNICATION SYSTEM, NON-TRANSITORY COMPUTER READABLE MEDIUM

(71) Applicant: NEC Corporation, Tokyo (JP)

(72) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 143 days.

(21) Appl. No.: 17/851,153

(22) Filed: Jun. 28, 2022

(65) Prior Publication Data

US 2023/0009413 A1 Jan. 12, 2023

(30) Foreign Application Priority Data

Jul. 8, 2021 (JP) .................................. 2021-113648

(51) Int. Cl.
*G06T 15/00* (2011.01)
*G06T 17/20* (2006.01)
*G06T 19/00* (2011.01)

(52) U.S. Cl.
CPC ............ *G06T 17/20* (2013.01); *G06T 19/006* (2013.01)

(58) Field of Classification Search
CPC ....... G06T 19/20; G06T 19/006; G06T 17/20; G06T 2219/2016
USPC ....................................................... 345/418
See application file for complete search history.

(56) References Cited

U.S. PATENT DOCUMENTS

| 11,867,979 | B2* | 1/2024 | Fonte ................... G02C 13/005 |
| 2023/0009413 | A1* | 1/2023 | Fujiwaka ................ G06T 19/20 |
| 2023/0154111 | A1* | 5/2023 | Khakhulin ............. G06V 10/82 |
| | | | 345/420 |
| 2023/0162404 | A1* | 5/2023 | Tian ........................ G06T 17/20 |
| | | | 345/420 |
| 2023/0290053 | A1* | 9/2023 | Bu .......................... G06T 15/00 |
| 2024/0013497 | A1* | 1/2024 | Sun .......................... G06T 7/40 |

FOREIGN PATENT DOCUMENTS

JP 2012-195629 A 10/2012

OTHER PUBLICATIONS

US 11,694,381 B2, 07/2023, Dirksen (withdrawn)*

(Continued)

*Primary Examiner* — Phu K Nguyen

(57) ABSTRACT

The analysis apparatus includes a calculation unit configured to calculate a transformation parameter used to transform a reference model indicating a three-dimensional shape of a target object into a three-dimensional shape indicated by three-dimensional sensing data indicating a result of sensing a target object after an elapse of a predetermined period of time since the reference model is generated; an update unit configured to update the reference model using the transformation parameter and three-dimensional sensing data; and a communication unit configured to transmit difference data between vertices of a reference model after the update and vertices of a reference model before the update, difference data between a representative point of the reference model after the update having the transformation parameter and a representative point of the reference model after the update, and a transformation parameter to a terminal device that shares a reference model.

9 Claims, 10 Drawing Sheets

(56) References Cited

OTHER PUBLICATIONS

Liu H, Yuan H, Liu Q, Hou J, Liu J. A comprehensive study and comparison of core technologies for MPEG 3-D point cloud compression. IEEE Transactions on Broadcasting. Dec. 30, 2019;66(3):701-17.*

Yang C, Wang Z, He W, Li Z. Development of a fast transmission method for 3D point cloud. Multimedia Tools and Applications. Oct. 2018;77(19):25369-87.*

Cao C, Preda M, Zaharia T. 3D point cloud compression: A survey. InThe 24th International Conference on 3D Web Technology Jul. 26, 2019 (pp. 1-9).*

Thanou D, Chou PA, Frossard P. Graph-Based Compression of Dynamic 3D Point Cloud Sequences. IEEE transactions on image processing: a publication of the IEEE Signal Processing Society. Apr. 2016;25(4):1765-78.*

* cited by examiner

ANALYSIS APPARATUS, COMMUNICATION SYSTEM, NON-TRANSITORY COMPUTER READABLE MEDIUM

INCORPORATION BY REFERENCE

This application is based upon and claims the benefit of priority from Japanese patent application No. 2021-113648, filed on Jul. 8, 2021, the disclosure of which is incorporated herein in its entirety by reference.

TECHNICAL FIELD

The present disclosure relates to an analysis apparatus, a communication system, an analysis method, and a program.

BACKGROUND ART

In recent years, xR communication has been widely used as highly realistic communication in which a real space and a virtual space are merged. The xR communication includes Virtual Reality (VR) communication, Augmented Reality (AR) communication, and Mixed Reality (MR) communication. In the xR communication, three-dimensional data in one space A is forwarded to another space B, where the situation in the space A is reproduced in a simulated manner. For example, three-dimensional data acquired by a three-dimensional (3D) camera in the space A is forwarded to the space B, where a stereoscopic image which is based on the forwarded three-dimensional data is displayed using an AR device. At this time, it is required to reduce the amount of data of the three-dimensional data forwarded from the space A to the space B.

Japanese Unexamined Patent Application Publication No. 2012-195629 discloses a configuration of a thin client system between a server device and a client device. In Japanese Unexamined Patent Application Publication No. 2012-195629, when the server device has transmitted an image A to the client device and the client device has performed, for example, an operation of moving the position of the image A to display an image B, the server device receives operating information from the client device. The server device generates difference images from the image A to the image B and transmits the difference images to the client device. The client device reproduces video images using the image A and the difference images. Accordingly, the server device does not need to transmit all the images from the image A to the image B to the client device, whereby the amount of data forwarded between the server device and the client device can be reduced.

SUMMARY

However, in Japanese Unexamined Patent Application Publication No. 2012-195629, the server device transmits image data indicating a change from the image A to the image B. Therefore, in a case in which highly realistic communication is performed as in xR communication, data forwarding is frequently performed. Therefore, taking into account this fact that data forwarding is frequently performed in xR communication, it is required to further reduce the amount of data forwarded between devices.

One of the objects of the present disclosure is to provide an analysis apparatus, a communication system, an analysis method, and a program capable of reducing the amount of data forwarded between the sensor apparatus and the display device.

An analysis apparatus according to a first aspect of the present disclosure includes: a calculation unit configured to calculate a transformation parameter of a representative point of a reference model used to transform the reference model indicating a three-dimensional shape of a target object into a three-dimensional shape indicated by three-dimensional sensing data indicating a result of sensing the target object after an elapse of a predetermined period of time since the reference model is generated; an update unit configured to update the reference model using the transformation parameter and the three-dimensional sensing data; and a communication unit configured to transmit difference data between vertices of the reference model after the update and vertices of the reference model before the update, difference data between a representative point of the reference model after the update and a representative point of the reference model before the update, and the transformation parameter to a terminal device that shares the reference model.

A communication system according to a second aspect of the present disclosure includes: an analysis apparatus including a calculation unit configured to calculate a transformation parameter of a representative point of a reference model used to transform the reference model indicating a three-dimensional shape of a target object into a three-dimensional shape indicated by three-dimensional sensing data indicating a result of sensing the target object after an elapse of a predetermined period of time since the reference model is generated, and an update unit configured to update the reference model using the transformation parameter and the three-dimensional sensing data; and a user terminal including a communication unit and a generation unit, the communication unit receiving difference data between vertices of the reference model after the update and vertices of the reference model before the update, difference data between a representative point of the reference model after the update and a representative point of the reference model before the update, and the transformation parameter, and the generation unit being configured to update the reference model using the difference data and generate a three-dimensional shape of the target object by applying the transformation parameter to the reference model.

An analysis method according to a third aspect of the present disclosure includes: calculating a transformation parameter of a representative point of a reference model used to transform the reference model indicating a three-dimensional shape of a target object into a three-dimensional shape indicated by three-dimensional sensing data indicating a result of sensing the target object after an elapse of a predetermined period of time since the reference model is generated; updating the reference model using the transformation parameter and the three-dimensional sensing data; and transmitting difference data between vertices of the reference model after the update and vertices of the reference model before the update and the transformation parameter to a terminal device that shares the reference model.

A program according to a fourth aspect of the present disclosure causes a computer to execute the following processing of: calculating a transformation parameter of a representative point of a reference model used to transform the reference model indicating a three-dimensional shape of a target object into a three-dimensional shape indicated by three-dimensional sensing data obtained by sensing the target object after an elapse of a predetermined period of time since the reference model is generated; updating the reference model using the transformation parameter and the three-dimensional sensing data; and transmitting difference data between vertices of the reference model after the update and vertices of the reference model before the update, difference data between a representative point of the reference model after the update and a representative point of the reference model before the update, and the transformation parameter to a terminal device that shares the reference model.

According to the present disclosure, it is possible to provide an analysis apparatus, a communication system, an analysis method, and a program capable of reducing the amount of data forwarded between the sensor apparatus and the display device.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

First Example Embodiment

Figure 1:
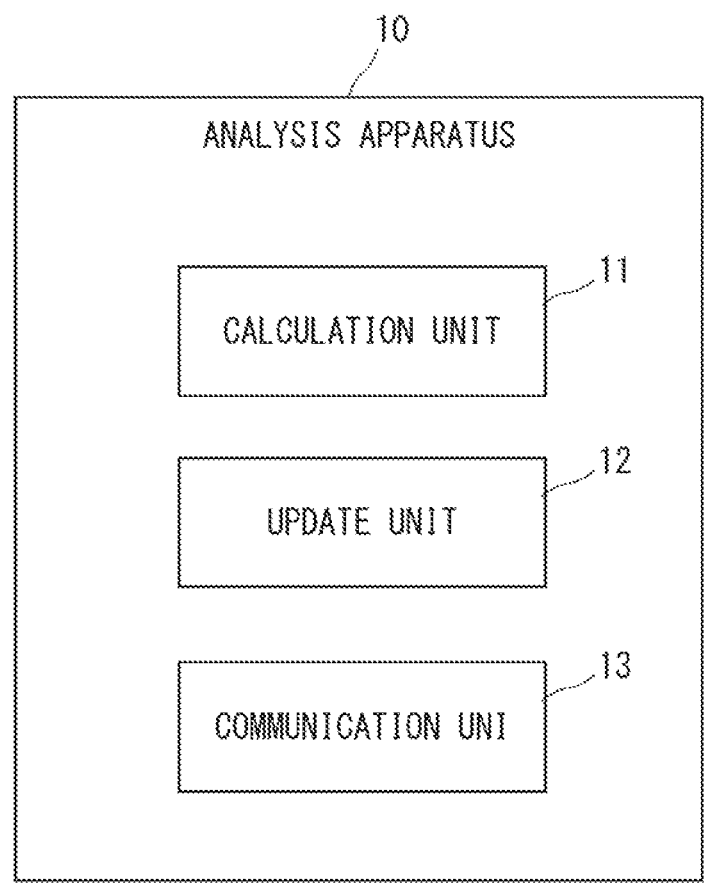
FIG. 1 is a configuration diagram of an analysis apparatus according to a first example embodiment.

Hereinafter, with reference to the drawings, example embodiments of the present disclosure will be described. With reference to FIG. 1, a configuration example of an analysis apparatus 10 according to a first example embodiment will be described. The analysis apparatus 10 may be a computer apparatus that is operated by a processor executing a program stored in a memory. For example, the analysis apparatus 10 may be a server device.

The analysis apparatus 10 includes a calculation unit 11, an update unit 12, and a communication unit 13. Each of the calculation unit 11, the update unit 12, and the communication unit 13 may be software or a module whose processing is executed by a processor executing the program stored in the memory. Alternatively, each of the calculation unit 11, the update unit 12, and the communication unit 13 may be hardware such as a circuit or a chip.

The calculation unit 11 calculates transformation parameters of representative points of a reference model used to transform a reference model indicating a three-dimensional shape into a three-dimensional shape indicated by three-dimensional sensing data indicating results of sensing the target object after an elapse of a predetermined period of time since the reference model is generated. The reference model indicating the three-dimensional shape may be, for example, mesh data, a mesh model, or polygon data, and may also be referred to as three-dimensional data. The reference model may be generated using, for example, three-dimensional sensing data obtained by sensing the target object. Sensing of the target object may indicate, for example, that images of the target object are captured using a camera. The three-dimensional sensing data may be captured data. The captured data may be, for example, distance data from the camera to the target object and three-dimensional point cloud data having two-dimensional image data. The two-dimensional image data may be, for example, Red Green Blue (RGB) image data.

The target object moves or operates with time. Therefore, the three-dimensional shape indicated by the three-dimensional sensing data of the target object after the elapse of a predetermined period of time since the reference model is generated is different from the three-dimensional shape indicated by the reference model. The transformation parameters may be parameters for defining amounts of rotation, amounts of translation or the like of some of the vertices (representative points) of the reference model.

The update unit 12 updates the reference model using transformation parameters and three-dimensional sensing data regarding the target object after the elapse of a predetermined period of time. Every time the reference model is updated, the amount of information indicating the shape of the reference model increases and the accuracy of indicating the target object is improved. The information indicating the shape of the reference model may be, for example, the number of vertices of the reference model, a plane formed by vertices or the like. The accuracy indicating the target object being improved may indicate that the reference model indicates the three-dimensional shape of the target object more accurately each time the update is repeated.

The update unit 12 may estimate, for example, the three-dimensional shape indicated by the reference model using the transformation parameters and the three-dimensional sensing data regarding the target object after the elapse of a predetermined period of time. The update unit 12 updates the reference model using, for example, the estimated three-dimensional shape.

The communication unit 13 transmits difference data between the vertices of the reference model after the update and the vertices of the reference model before the update, and the transformation parameter to the terminal device that shares the reference model.

The terminal device is a device that displays the target object that is present in a remote place. The terminal device may be, for example, an AR device, a VR device, or an MR device.

The terminal device includes a reference model that is the same as the reference model that the analysis apparatus 10 has. Therefore, the terminal device is able to generate three-dimensional data indicating the three-dimensional shape of the target object after the elapse of a predetermined period of time by receiving the transformation parameter and applying the transformation parameter to the reference model. Further, the terminal device updates the reference model by using difference data between the vertices of the reference model after the update and the vertices of the reference model before the update. Accordingly, the terminal device improves the accuracy of the reference model indicating the target object, like in the analysis apparatus 10.

As described above, the analysis apparatus 10 transmits the transformation parameters and the difference data between vertices to the terminal device that displays the target object that is present in a remote place without transmitting all the images and all the vertices of a point cloud. The terminal device is able to update the reference model, like in the analysis apparatus 10, by using the difference data between the vertices and the difference data between the representative points. Further, the terminal device is able to generate, by using the transformation parameter, three-dimensional data indicating the three-dimensional shape of the target object after an elapse of a predetermined period of time since the reference model is generated. The analysis apparatus 10 transmits the transformation parameters and the difference data whose amount of data is smaller than that of the image data. Therefore, the analysis apparatus 10 is able to reduce the amount of data forwarded between the analysis apparatus 10 and the terminal device compared to a case in which all the pieces of image data and all the vertices of the point cloud are transmitted.

Second Example Embodiment

Figure 2:
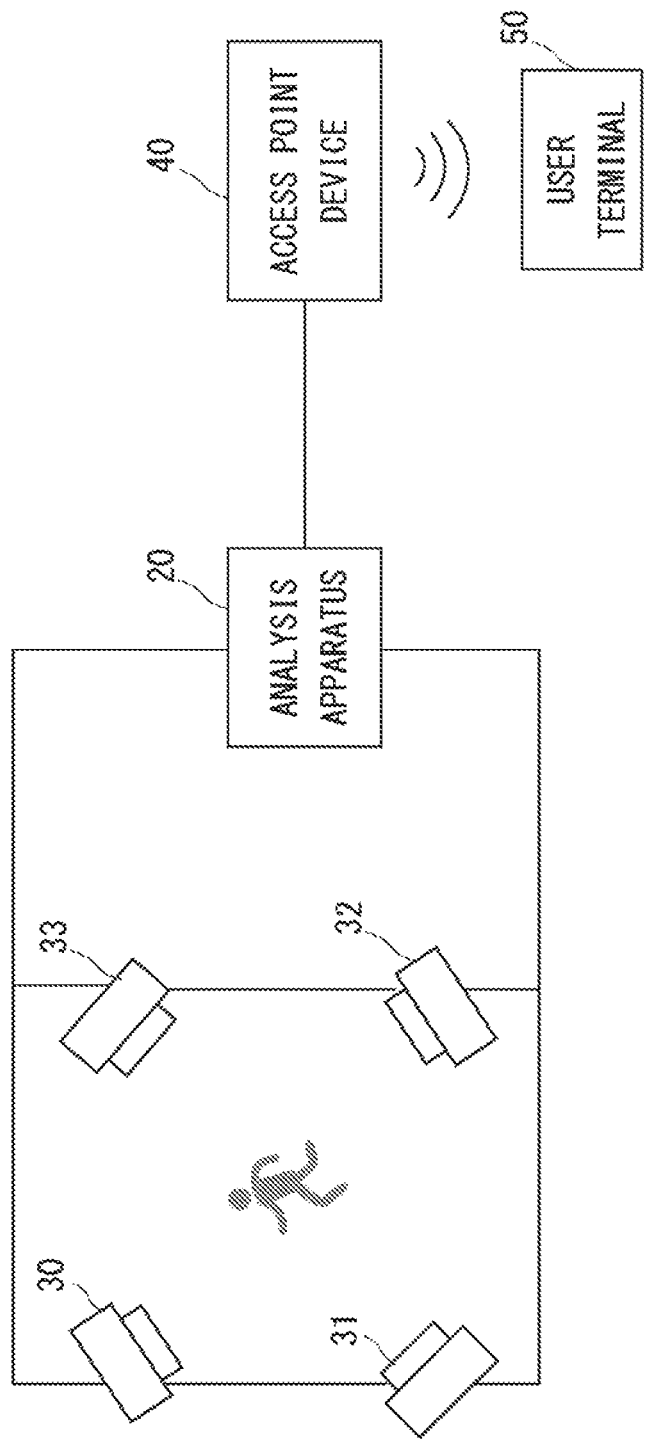
FIG. 2 is a configuration example of an AR communication system according to a second example embodiment.

Referring next to FIG. 2, a configuration example of an AR communication system according to a second example embodiment will be described. The AR communication system shown in FIG. 2 includes an analysis apparatus 20, cameras 30-33, an access point device 40, and a user terminal 50. The analysis apparatus 20 corresponds to the analysis apparatus 10 shown in FIG. 1. While FIG. 2 shows a configuration example of the AR communication system including four cameras, the number of cameras is not limited to four.

The cameras 30-33 are specific examples of the 3D sensors and may be devices other than the cameras that acquire three-dimensional data of the target object. The cameras 30-33, which are, for example, 3D cameras, each generate point cloud data of the target object. The point cloud data includes values regarding the positions of the target object in the images and the distance from each camera to the target object. The image indicated by the point cloud data, which is an image indicating the distance from the camera to the target object, may be referred to as, for example, a depth image or a depth map. The cameras 30-33 each capture images of the target object and transmit the point cloud data, which is captured data, to the analysis apparatus 20 via a network. It is assumed that the cameras 30-33 capture images of the target object in time synchronization.

The analysis apparatus 20 receives the point cloud data from the cameras 30-33 and generates analysis data that is necessary to cause the user terminal 50 to display the target object. The analysis data includes transformation parameters, difference data and the like.

The access point device 40, which is, for example, a communication device that supports wireless Local Area Network (LAN) communication, may be referred to as a wireless LAN master unit. The user terminal 50 may be, for example, an xR device, and specifically, an AR device. On the other hand, the user terminal 50 that performs wireless LAN communication with the access point device 40 may be referred to as a wireless LAN slave unit.

The user terminal 50 performs wireless LAN communication with the access point device 40 and receives analysis data generated in the analysis apparatus 20 via the access point device 40. Note that the user terminal 50 may receive analysis data from the analysis apparatus 20 via a mobile network, without performing wireless LAN communication or may receive analysis data from the analysis apparatus 20 via a fixed communication network such as an optical network.

Figure 3:
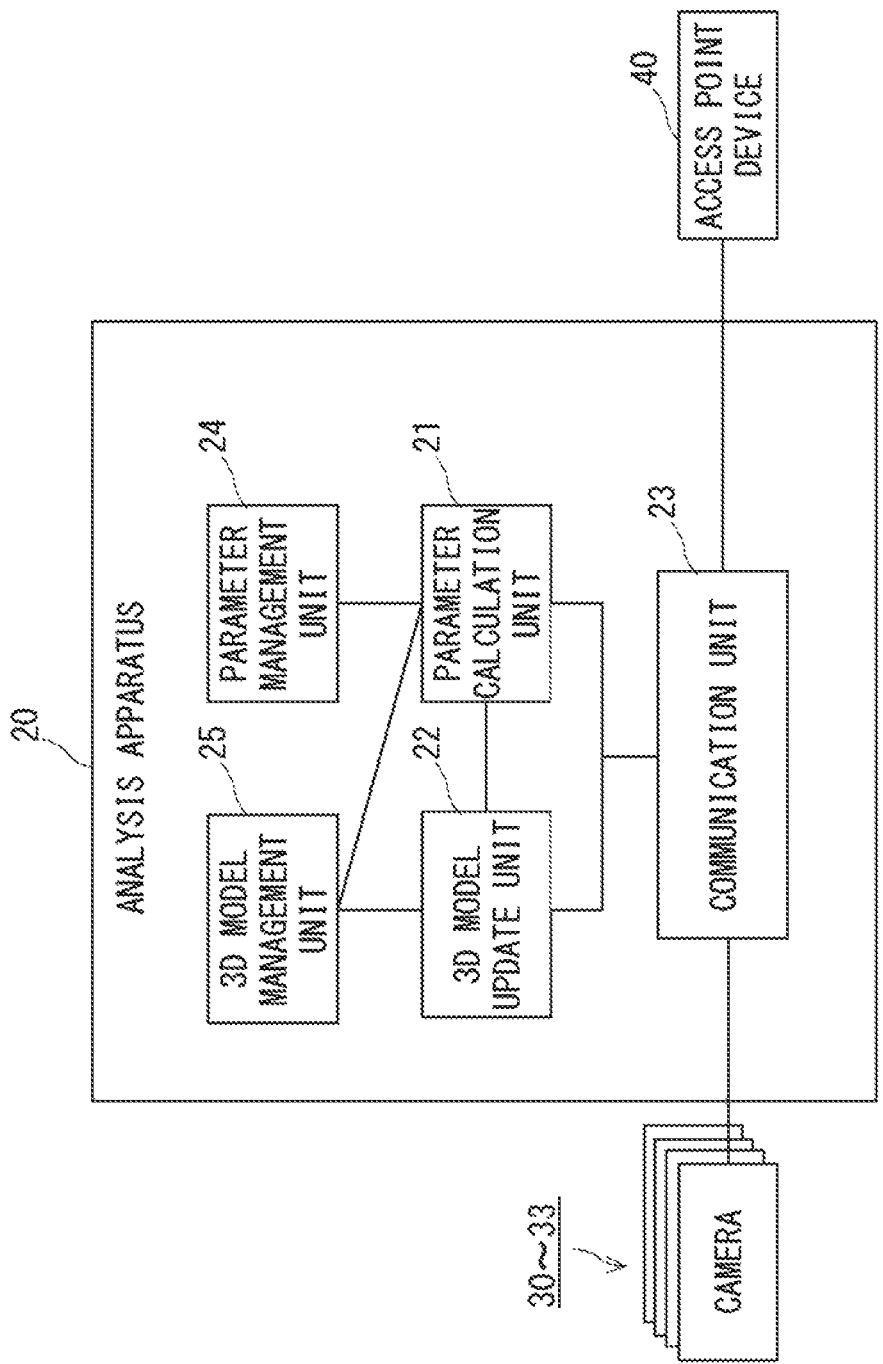
FIG. 3 is a configuration example of an analysis apparatus according to the second example embodiment.

Referring next to FIG. 3, a configuration example of the analysis apparatus 20 will be described. The analysis apparatus 20 includes a parameter calculation unit 21, a 3D model update unit 22, a communication unit 23, a parameter management unit 24, and a 3D model management unit 25. Each of the parameter calculation unit 21, the 3D model update unit 22, the communication unit 23, the parameter management unit 24, and the 3D model management unit 25 may be software or a module whose processing is executed by executing a program. Alternatively, each of the parameter calculation unit 21, the 3D model update unit 22, the communication unit 23, the parameter management unit 24, and the 3D model management unit 25 may be hardware such as a circuit or a chip. The parameter calculation unit 21 corresponds to the calculation unit 11 shown in FIG. 1. The 3D model update unit 22 corresponds to the update unit 12 shown in FIG. 1. The communication unit 23 corresponds to the communication unit 13 shown in FIG. 1.

The communication unit 23 receives point cloud data including the target object from the cameras 30-33. The communication unit 23 outputs the received point cloud data to the 3D model update unit 22. The 3D model update unit 22 creates a reference model if it has not yet created one regarding the target object. For example, the 3D model update unit 22 synthesizes the respective pieces of point cloud data received from the respective cameras and generates point cloud data including the target object. Synthesizing the point cloud data may instead be referred to as integrating the point cloud data. For example, Iterative Closest Point (ICP), posture estimation processing or the like may be used to integrate the point cloud data. For example, Perspective-n-Point (PnP) solver may be used for posture estimation processing. Further, the 3D model update unit 22 generates the reference model of the target object from the point cloud data. The reference model is composed of a point cloud and representative points having transformation parameters, the representative points being included in the point cloud. By transforming the reference model, it becomes possible to obtain a new point cloud and generate mesh data from the obtained point cloud. Generating mesh data may instead be referred to as constructing a mesh. The mesh data is data that shows a stereoscopic shape of the surface of the target object by a triangular surface or a quadrilateral surface obtained by combining the respective vertices with one another, the vertices being points included in the point cloud data.

The 3D model update unit 22 stores the reference model in the 3D model management unit 25. Further, the 3D model update unit 22 transmits data regarding the reference model to the user terminal 50 via the communication unit 23 and the access point device 40. The data regarding the reference model may include data indicating the positions of the vertices and vertices including transformation parameters. Alternatively, if the user terminal 50 is able to generate mesh data from the point cloud data, like in the 3D model update unit 22, the 3D model update unit 22 may transmit point cloud data obtained by synthesizing the pieces of point cloud data generated in the respective cameras to the user terminal 50. The user terminal 50 receives the reference model or the user terminal 50 generates the reference model from the point cloud data, like in the 3D model update unit 22, whereby the analysis apparatus 20 and the user terminal 50 share one reference model.

If the communication unit 23 has received the point cloud data from the cameras 30-33 after the reference model is generated in the 3D model update unit 22, the parameter calculation unit 21 calculates the transformation parameter using the reference model and the point cloud data. Here, the parameter calculation unit 21 generates the point cloud data obtained by synthesizing the pieces of point cloud data generated in the respective cameras, like in the 3D model update unit 22. Alternatively, the parameter calculation unit 21 may receive point cloud data after the synthesis from the 3D model update unit 22 when the respective pieces of point cloud data have been synthesized in the 3D model update unit 22.

The parameter calculation unit 21 extracts representative points from the vertices of the reference model stored in the 3D model management unit 25 and generates representative point data indicating the representative points. The parameter calculation unit 21 may randomly extract the representative points from all the vertices included in the reference model or may extract the representative points by executing the k-means method in such a way that the representative points are equally arranged in the target object.

The parameter calculation unit 21 calculates the transformation parameters in such a way that the vertices of the reference model indicate the three-dimensional shape indicated by the point cloud data of the target object received after the reference model is generated. The transformation parameter is calculated for each representative point. When there are n (n is an integer equal to or larger than 1) representative points, the transformation parameter is represented by a transformation parameter $W_k$. The symbol k, which is a value for identifying the representative point, may be a value from 1 to n. All the transformation parameters may be indicated as the transformation parameter $W=[W_1, W_2, W_3, \ldots W_n]$. The transformation parameter $W_k$ may include a rotation matrix $R_k$ and a translation matrix $T_k$ and may be represented by $W_k=[R_k|T_k]$. If a vertex of the reference model is denoted by a vertex $v_i$, a vertex $v'_i$ after the transformation may be represented by $v'_i=\Sigma\alpha_k(v_i)\cdot Q_k(v_i)$, $Q_k(v_i)=R_k\cdot(v_i-v_k)+v_k+T_k$. The symbol "·" indicates multiplication. The symbol $v_k$ denotes the representative point of the reference model, $\alpha_k$ is a function for calculating the closeness between the representative point $v_k$ and the vertex $v_i$, and the total sum becomes 1, that is, $\Sigma\alpha_k(v_i)=1$. The value $\alpha_k(v_i)$ becomes larger as $v_i$ becomes closer to the representative point, that is, the vertex after the transformation becomes close to the representative point. This $Q_k(v_i)$ is one example of causing rotation and translation to act on a point, and another expression for causing rotation and translation to act on a point may instead be used.

Figure 4:
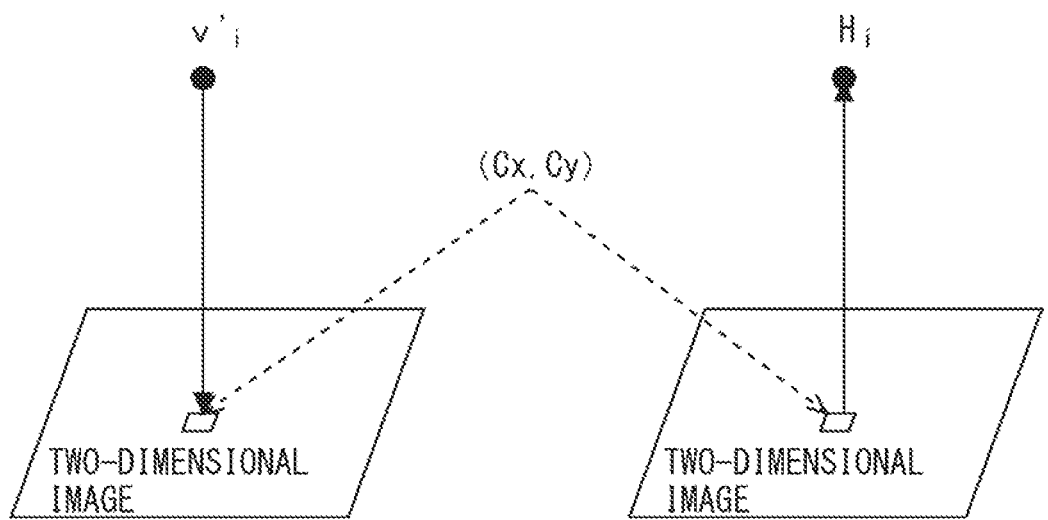
FIG. 4 is a diagram for describing an example of calculating a transformation parameter according to the second example embodiment.

Now, an example of calculating the transformation parameter $W=[W_1, W_2, W_3, \ldots W_n]$ in the parameter calculation unit 21 will be described. The left view of FIG. 4 shows that the vertex $v'_i$ after the transformation has been projected onto coordinates (Cx, Cy) on a two-dimensional image. The two-dimensional image may be an image on the X-Y plane of the image shown using the point cloud data. Further, the right view of FIG. 4 shows a point $H_i$ on a three-dimensional space that corresponds to the coordinates (Cx, Cy) on the two-dimensional image of the point cloud data received after the generation of the reference model. Internal parameters of the camera are used for projection of the vertex $v'_i$ after the transformation onto the coordinates (Cx, Cy) on the two-dimensional image, and this projection is performed in such a way that its coordinate system becomes the same as the coordinate system on the two-dimensional image of the camera. The distance data of the vertex $v'_i$ after the transformation is denoted by $v'_i(D)$ and the distance data of the point $H_k$ is denoted by $H_k(D)$. The parameter calculation unit 21 calculates the transformation parameter $W=[W_1, W_2, W_3, \ldots W_n]$ that makes $\Sigma|v'_i(D)-H_i(D)|^2$ be a minimum. The part $|v'_i(D)-H_i(D)|$ indicates an absolute value of $v'_k(D)-H_i(D)$. Here, i in $\Sigma|v'_i(D)-H_i(D)|^2$ may have a value from 1 to m. The symbol m indicates the number of vertices of the reference model.

The parameter calculation unit 21 outputs the transformation parameter W to the parameter management unit 24 and the 3D model update unit 22. The 3D model update unit 22 transforms the reference model into a three-dimensional shape indicated by the point cloud data received after the generation of the reference model by applying the transformation parameter W to the reference model stored in the 3D model management unit 25. The three-dimensional shape indicated by the point cloud data received after the generation of the reference model is assumed to be three-dimensional data.

For example, the 3D model update unit 22 calculates representative points after the transformation using the transformation parameters W for the respective representative points included in the reference model. The 3D model update unit 22 transforms the representative points using the transformation parameters W and the vertices other than the representative points are transformed using the transformation parameter W used for a nearby representative point. In this manner, transforming the positions of the representative points using the transformation parameters and transforming the positions of the vertices other than the representative points using the transformation parameter used in the nearby representative point may be referred to as non-rigid transformation.

Figure 5:
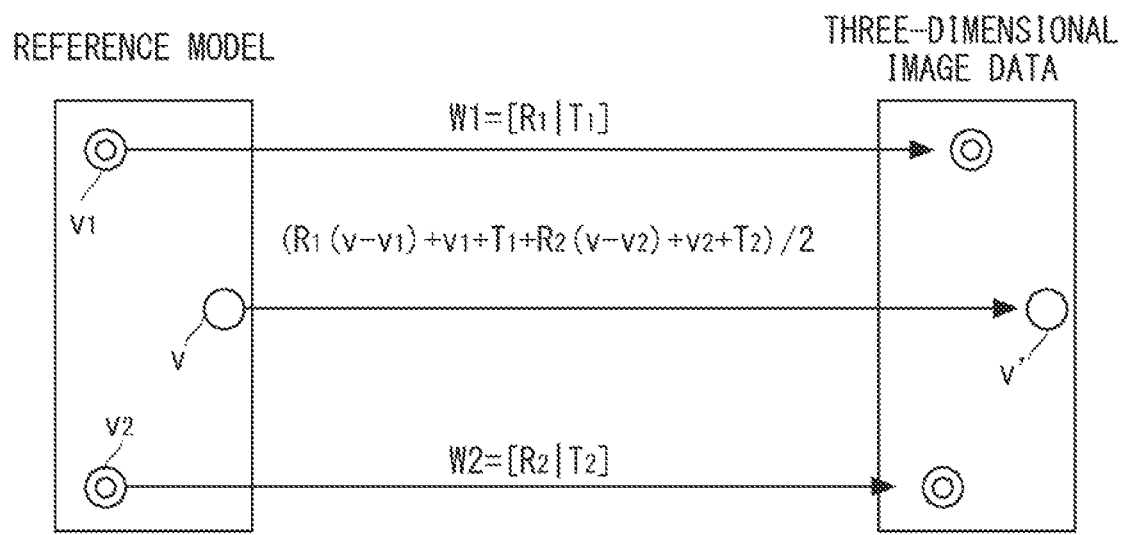
FIG. 5 is a diagram for describing non-rigid transformation according to the second example embodiment.

With reference next to FIG. 5, the non-rigid transformation will be described. FIG. 5 shows the positions of the vertices in the three-dimensional data regarding the three-dimensional shape indicated by the point cloud data received after the reference model is generated, after the vertices included in the reference model are transformed. In FIG. 5, double circles indicate the representative points and single circles indicate the vertices other than the representative points. For the sake of simplification of the description, a case in which only these three points are present in the reference model will be described. It is assumed here that the distances between the vertex v other than the representative points and each of two representative points are the same. At this time, $\alpha_k(v)=0.5$ (k=1, 2) is established and v' after the transformation can be expressed by $v'=(R_1\cdot(v-v_1)+v_1+T_1+R_2\cdot(v-v_2)+v_2+T_2)/2$. The symbol "/" indicates division. The representative point $v_k$ may be set as $\alpha_{k'}(v_k)=0.0$ (k≠k'), $\alpha_{k'}(v_k)=1.0$ (k==k') in such a way that it is not affected by the nearby representative point, or a transformation expression may be used like other vertices.

Referring once again to FIG. 3, the 3D model update unit 22 transforms the point cloud of the reference model by performing non-rigid transformation, and generates mesh data using the point cloud after the transformation.

Next, processing of updating the reference model executed in the 3D model update unit 22 will be described. The 3D model update unit 22 applies an inverse transformation parameter $W^{-1}$ of the transformation parameter W calculated in the parameter calculation unit 21 to the point cloud data received after the reference model is generated. The point cloud data to which the inverse transformation parameter $W^{-1}$ is applied is transformed into point cloud data indicating a three-dimensional shape that is substantially the same as that of the reference model. A point cloud generated by performing, for example, processing of averaging on the reference model and the inversely-transformed point cloud is updated as a new reference model. Averaging may be performed by a weighted average or the like in which time is taken into account after, for example, the point cloud is expressed by a data structure by a Truncated Signed Distance Function (TSDF). The representative points may be newly generated based on the updated reference model or only representative points that have been greatly changed may be updated.

Figure 6:
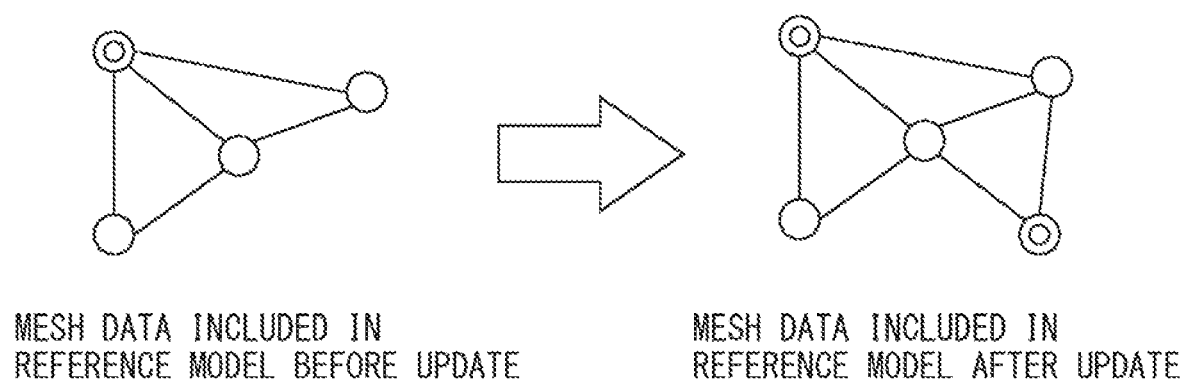
FIG. 6 is a diagram for describing update of a reference model according to the second example embodiment.

With reference to FIG. 6, the difference between the point cloud data after the inverse transformation parameter $W^{-1}$ is applied and the vertices of the reference model will be described. The left view in FIG. 6 shows mesh data included in the reference model before the update. Double circles indicate the representative points. Mesh data is shown by a triangular surface that uses three vertices. The right view shows mesh data in which the vertices after the inverse transformation parameter $W^{-1}$ has been applied is used. The mesh data in the right view is different from the mesh data in the left view in that the number of vertices in the mesh data in the right view is larger by one than that in the mesh data in the left view. While the added vertex is indicated as a representative point in FIG. 6, it may not be a representative point. Accordingly, by updating the reference model using the newly added vertex, the accuracy of the reference model can be improved.

The 3D model update unit 22 transmits the difference data between the reference model before the update and the reference model after the update to the user terminal 50 via the communication unit 23. The difference data may include data regarding a vertex or a representative point that has been newly added to the reference model after the update or has been deleted from the reference model, and data regarding a vertex of a triangular surface or a quadrilateral surface that has been newly added.

Figure 7:
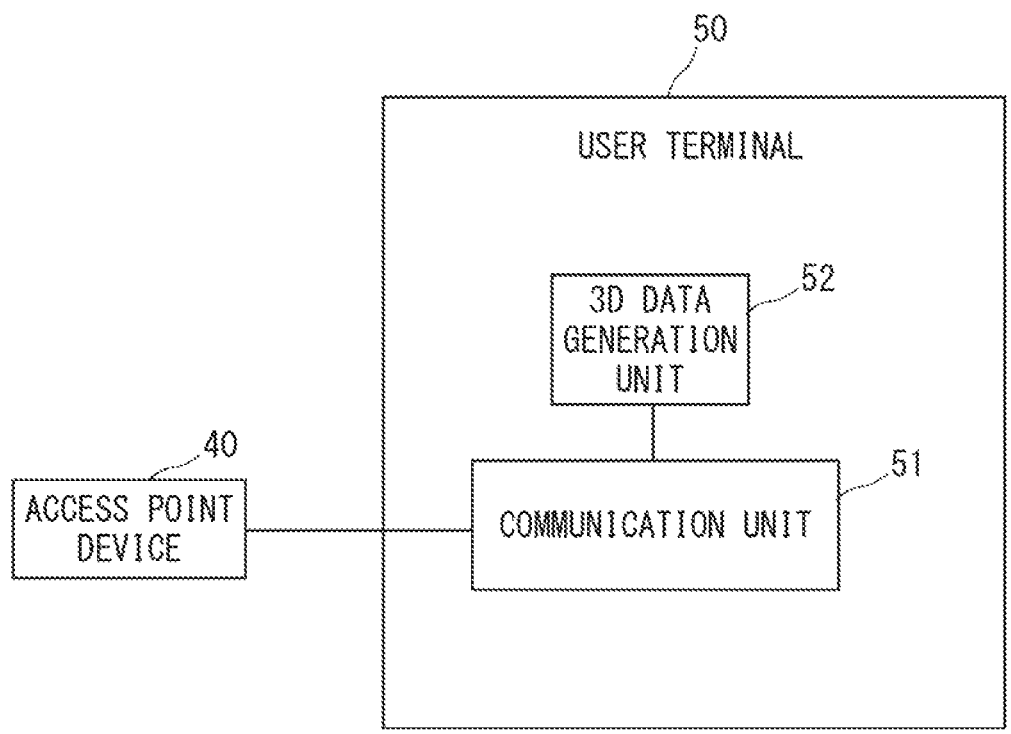
FIG. 7 is a configuration diagram of a user terminal according to the second example embodiment.

Next, with reference to FIG. 7, a configuration example of the user terminal 50 according to the second example embodiment will be described. The user terminal 50 may be a computer apparatus that is operated by executing a program. The user terminal 50 may be an xR device, specifically, an AR device.

The user terminal 50 includes a communication unit 51 and a 3D data generation unit 52. Each of the communication unit 51 and the 3D data generation unit 52 may be software or a module whose processing is executed by a processor executing the program stored in the memory.

The communication unit 51 receives data regarding the reference model from the analysis apparatus 20 via the access point device 40. Further, the communication unit 51 receives difference data between the reference model before the update and the reference model after the update, and the transformation parameter from the analysis apparatus 20.

The 3D data generation unit 52 generates the reference model using the data regarding the reference model that has been received from the analysis apparatus 20. For example, if the 3D data generation unit 52 has received data regarding the vertices of the reference model, the 3D data generation unit 52 generates mesh data using the data regarding the vertices of the reference model.

Further, the 3D data generation unit 52 updates the reference model using the received difference data, just like the analysis apparatus 20 does. The 3D data generation unit 52 further transforms the positions of the vertices of the reference model using the received transformation parameter W and generates mesh data using the vertices after the transformation. The 3D data generation unit 52 outputs the generated mesh data to a display unit (not shown) of the user terminal 50 and causes this display unit to display this mesh data.

Figure 8:
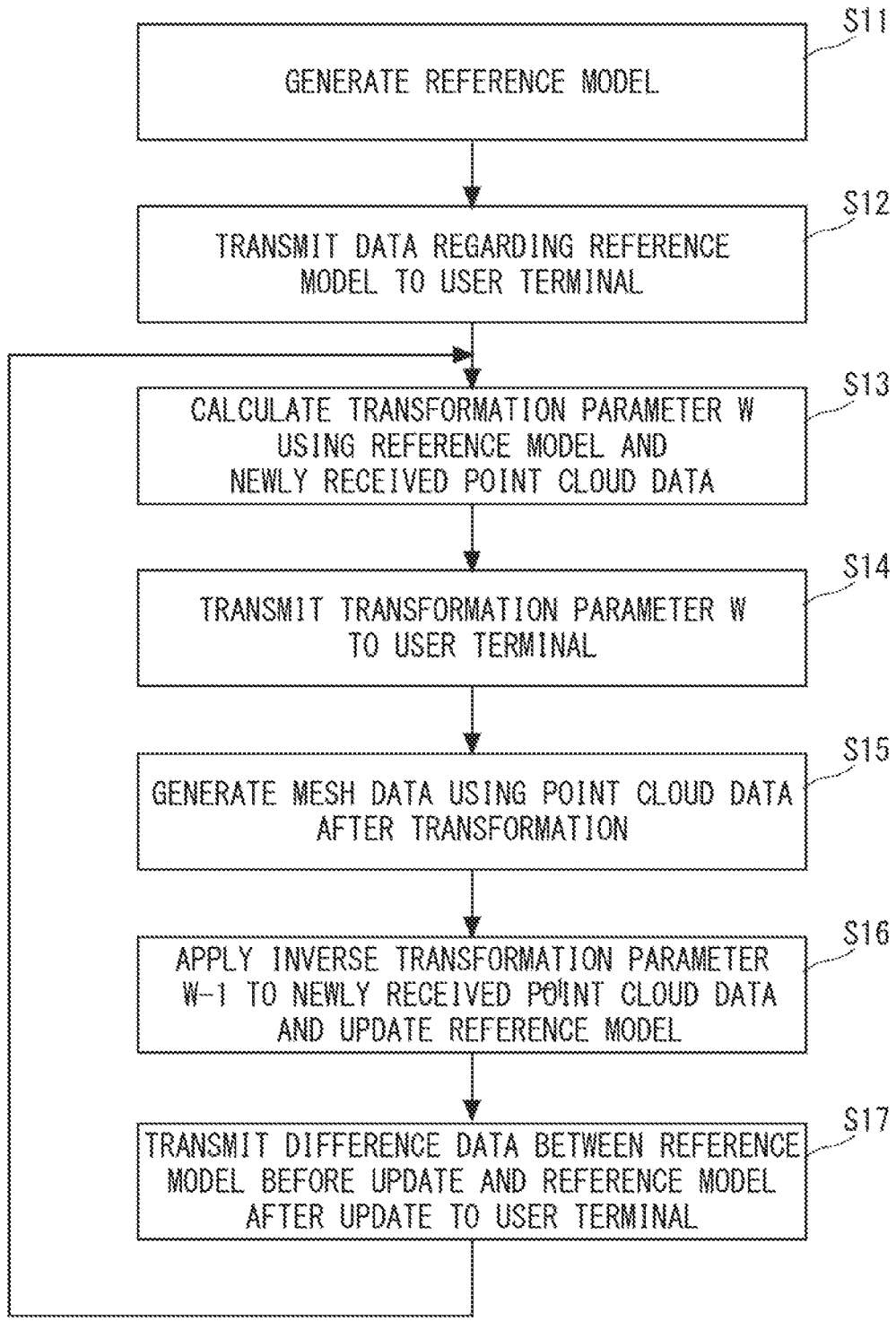
FIG. 8 is a diagram showing a flow of processing of updating the reference model in the analysis apparatus according to the second example embodiment.

Next, with reference to FIG. 8, processing of updating the reference model in the analysis apparatus 20 according to the second example embodiment will be described. First, the 3D model update unit 22 generates the reference model of the target objet using the point cloud data received from the cameras 30-33 (S11). For example, the 3D model update unit 22 generates mesh data as the reference model.

Next, the 3D model update unit 22 transmits data regarding the reference model to the user terminal 50 via the communication unit 23 (S12). The data regarding the reference model may include data indicating the positions of the vertices and a combination of vertices. That is, the 3D model update unit 22 may transmit mesh data including data indicating the positions of the vertices and a combination of vertices.

Next, the parameter calculation unit 21 calculates the transformation parameter W using the reference model, and the point cloud data newly received from the cameras 30-33 (S13). The point cloud data that has been newly received, which is data indicating a substantially real-time three-dimensional shape of the target object, may be referred to as real-time data. The parameter calculation unit 21 calculates the transformation parameter W for transforming the vertices arranged on the surface of the reference model into the position indicating the three-dimensional shape of the target object formed by the point cloud data newly received from the cameras 30-33.

Next, the parameter calculation unit 21 transmits the transformation parameter W to the user terminal 50 via the communication unit 23 (S14). Next, the 3D model update unit 22 transforms the positions of the vertices of the reference model using the transformation parameter W, and generates the mesh data using the point cloud data after the transformation (S15).

Next, the 3D model update unit 22 applies the inverse transformation parameter $W^{-1}$ to the point cloud data newly received from the cameras 30-33 and updates the reference model using the point cloud data after the inverse transformation (S16). The 3D model update unit 22 detects the difference between the point cloud data after the inverse transformation and data of the vertices of the reference model and adds the points included in only the point cloud data after the inverse transformation parameter $W^{-1}$ has been applied to the reference model. The 3D model update unit 22 updates the reference model by generating the mesh data using the newly added vertex.

Next, the 3D model update unit 22 transmits the difference data between the reference model before the update and the reference model after the update to the user terminal 50 via the communication unit 23 (S17). In the following process, processing of Step S13 and processing after Step S13 are repeated, and the reference model is updated.

Figure 9:
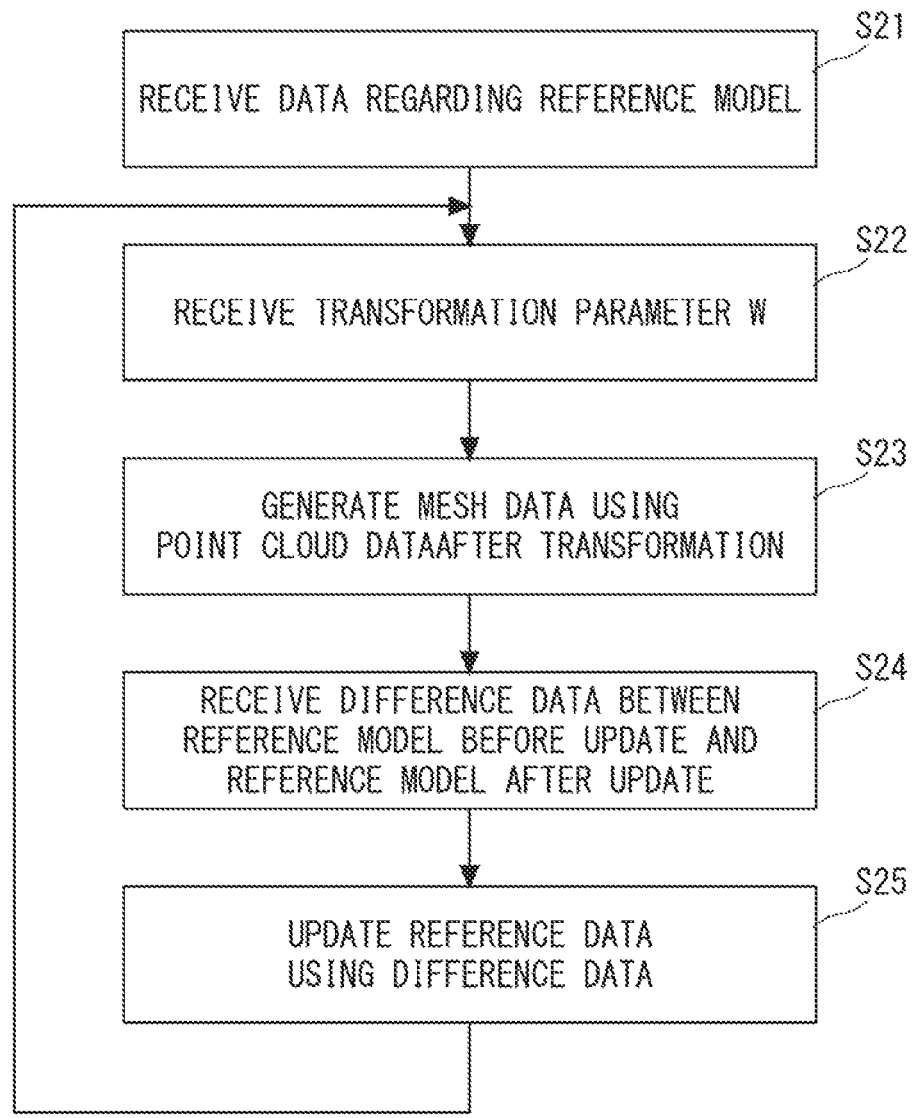
FIG. 9 is a diagram showing a flow of processing of updating the reference model in the user terminal according to the second example embodiment.

Referring next to FIG. 9, a flow of processing of updating the reference model in the user terminal 50 will be described. First, the communication unit 51 receives the data regarding the reference model from the analysis apparatus 20 (S21). Next, the communication unit 51 receives the transformation parameter W from the analysis apparatus 20 (S22).

Next, the 3D data generation unit 52 applies the transformation parameter W to the vertices arranged on the surface of the reference model and generates mesh data using the obtained point cloud data (S23).

Next, the communication unit 51 receives the difference data between the reference model before the update and the reference model after the update (S24). Next, the 3D data generation unit 52 updates the reference model using the difference data, like in the analysis apparatus 20. In the following process, processing of Step S22 and processing after Step 22 are repeated, and the reference model is updated.

As described above, the analysis apparatus 20 transmits the transformation parameter, and the difference data between the reference model before the update and the reference model after the update to the user terminal 50. The amount of difference data is reduced each time the reference model is updated. In other words, each time the reference model is updated, the amount of information regarding the vertex to be newly added and a plane generated by combining the vertices is reduced. As a result, the analysis apparatus 20 is able to reduce the amount of data transmitted to the user terminal 50 each time the reference model is updated. Further, the analysis apparatus 20 and the user terminal 50 share one reference model. Therefore, the user terminal 50 is able to generate the real-time shape of the target object by applying the transformation parameter received from the analysis apparatus 20 to the reference model. The analysis apparatus 20 is able to reduce the amount of data to be transmitted by transmitting the transformation parameters without transmitting all the real-time images regarding the target object and all the vertices of the point cloud.

Figure 10:
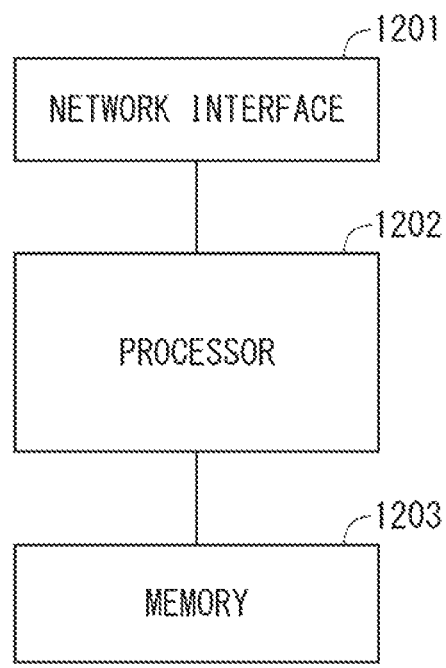
FIG. 10 is a configuration diagram of an analysis apparatus and a user terminal according to each of the example embodiments.

FIG. 10 is a block diagram showing a configuration example of the analysis apparatus 10, the analysis apparatus 20, and the user terminal 50 (hereinafter these components are denoted by "the analysis apparatus 10 and the like"). Referring to FIG. 10, the analysis apparatus 10 and the like include a network interface 1201, a processor 1202, and a memory 1203. The network interface 1201 may be used to communicate with another network node. The network interface 1201 may include, for example, a network interface card (NIC) that is in compliance with IEEE 802.3 series.

The processor 1202 loads software (computer program) from the memory 1203 and executes the loaded software (computer program), thereby performing processing of the analysis apparatus 10 and the like described with reference to the flowcharts in the above example embodiments. The processor 1202 may be, for example, a microprocessor, an MPU, or a CPU. The processor 1202 may include a plurality of processors.

The memory 1203 is composed of a combination of a volatile memory and a non-volatile memory. The memory 1203 may include a storage located away from the processor 1202. In this case, the processor 1202 may access the memory 1203 via an Input/Output (I/O) interface that is not shown.

In the example shown in FIG. 10, the memory 1203 is used to store software modules. The processor 1202 loads these software modules from the memory 1203 and executes the loaded software modules, thereby being able to perform processing of the analysis apparatus 10 and the like described in the above example embodiments.

As described with reference to FIG. 10, each of the processors included in the analysis apparatus 10 and the like in the above example embodiments executes one or more programs including instructions for causing a computer to execute the algorithm described with reference to the drawings.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the aforementioned example embodiments and may be changed as appropriate without departing from the spirit of the present disclosure.

REFERENCE SIGNS LIST

10 Analysis Apparatus
11 Calculation Unit
12 Update Unit
13 Communication Unit
20 Analysis Apparatus
21 Parameter Calculation Unit
22 3D Model Update Unit
23 Communication Unit
24 Parameter Management Unit
25 3D Model Management Unit
30 Camera
31 Camera
32 Camera
33 Camera
40 Access Point Device
50 User Terminal
51 Communication Unit
52 3D Data Generation Unit

What is claimed is:

1. An analysis apparatus comprising:
at least one memory storing instructions, and
at least one processor configured to execute the instructions to;
calculate a transformation parameter of a representative point of a reference model used to transform the reference model indicating a three-dimensional shape of a target object into a three-dimensional shape indicated by three-dimensional sensing data indicating a result of sensing the target object after an elapse of a predetermined period of time since the reference model is generated;
update the reference model using the transformation parameter and the three-dimensional sensing data; and
transmit difference data between vertices of the reference model after the update and vertices of the reference model before the update, difference data between a representative point of the reference model after the update having the transformation parameter and a representative point of the reference model before the update, and the transformation parameter to a terminal device that shares the reference model.

2. The analysis apparatus according to claim 1, wherein the at least one processor is further configured to execute the instructions to update the reference model using three-dimensional data obtained by applying an inverse transformation parameter of the transformation parameter to the three-dimensional sensing data.

3. The analysis apparatus according to claim 1, wherein the reference model is a mesh model shown using a plurality of planes obtained by combining a plurality of vertices arranged on the surface of the reference model with each other.

4. The analysis apparatus according to claim 3, wherein the reference model regards some of the plurality of vertices as representative points, and
the at least one processor is further configured to execute the instructions to calculate the transformation parameter for each of the representative points.

5. The analysis apparatus according to claim 3, wherein the at least one processor is further configured to execute the instructions to transmit data regarding the vertices included in the reference model after the update but are not included in the reference model before the update to the terminal device.

6. communication system comprising:
an analysis apparatus; and
a user terminal;
wherein the analysis apparatus comprises;
at least one memory storing instructions, and
at least one processor configured to execute the instructions to;
calculate a transformation parameter of a representative point of a reference model used to transform the reference model indicating a three-dimensional shape of a target object into a three-dimensional shape indicated by three-dimensional sensing data indicating a result of sensing the target object after an elapse of a predetermined period of time since the reference model is generated, and
update the reference model using the transformation parameter and the three-dimensional sensing data;
wherein the user terminal comprises;
at least one memory storing instructions, and
at least one processor configured to execute the instructions to;
receive difference data between vertices of the reference model after the update and vertices of the reference model before the update, difference data between a representative point of the reference model after the update having the transformation parameter and a representative point of the reference model before the update, and the transformation parameter, and
update the reference model using the difference data and generate a three-dimensional shape of the target object by applying the transformation parameter to the reference model.

7. The communication system according to claim 6, wherein the at least one processor is further configured to execute the instructions to update the reference model using three-dimensional data obtained by applying an inverse transformation parameter of the transformation parameter to the three-dimensional sensing data.

8. An analysis method comprising:
calculating a transformation parameter of a representative point of a reference model used to transform the reference model indicating a three-dimensional shape of a target object into a three-dimensional shape indicated by three-dimensional sensing data indicating a result of sensing the target object after an elapse of a predetermined period of time since the reference model is generated;
updating the reference model using the transformation parameter and the three-dimensional sensing data; and
transmitting difference data between vertices of the reference model after the update and vertices of the reference model before the update, difference data between a representative point of the reference model after the update having the transformation parameter and a representative point of the reference model before the update, and the transformation parameter to a terminal device that shares the reference model.

9. A non-transitory computer readable medium storing a program for causing a computer to execute the following processing of:
calculating a transformation parameter of a representative point of a reference model used to transform the reference model indicating a three-dimensional shape of a target object into a three-dimensional shape indicated by three-dimensional sensing data indicating a result of sensing the target object after an elapse of a predetermined period of time since the reference model is generated;
updating the reference model using the transformation parameter and the three-dimensional sensing data; and
transmitting difference data between vertices of the reference model after the update and vertices of the reference model before the update, difference data between a representative point of the reference model after the update having the transformation parameter and a representative point of the reference model before the update, and the transformation parameter to a terminal device that shares the reference model.

\* \* \* \* \*